(12) United States Patent
Zurko et al.

(10) Patent No.: US 11,516,251 B2
(45) Date of Patent: *Nov. 29, 2022

(54) FILE RESHARING MANAGEMENT

(71) Applicant: International Business Machines Corporation, Armonk, NY (US)

(72) Inventors: Mary Ellen Zurko, Groton, MA (US); David J. Toth, Durham, NC (US); Satwiksai Seshasai, Arlington, MA (US); Charles P. de Saint-Aignan, Providence, RI (US); Christopher J. Paul, Waxhaw, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 15/354,700

(22) Filed: Nov. 17, 2016

(65) Prior Publication Data
US 2017/0070538 A1 Mar. 9, 2017

Related U.S. Application Data

(63) Continuation of application No. 12/569,809, filed on Sep. 29, 2009, now Pat. No. 9,507,793.

(51) Int. Cl.
*G06F 16/00* (2019.01)
*H04L 9/40* (2022.01)
*G06F 16/176* (2019.01)

(52) U.S. Cl.
CPC ............ *H04L 63/20* (2013.01); *G06F 16/176* (2019.01); *H04L 63/104* (2013.01)

(58) Field of Classification Search
CPC ............ G06F 17/30165; G06F 16/176; H04L 63/104; H04L 63/20
See application file for complete search history.

(56) References Cited

U.S. PATENT DOCUMENTS 6,216,140 B1 4/2001 Kramer
7,536,386 B2 5/2009 Samji et al.
8,161,069 B1 4/2012 Wilder et al.
(Continued)

FOREIGN PATENT DOCUMENTS

WO 2009030158 A1 3/2009
WO WO-2009/030158 * 3/2009
WO WO 2009/030158 3/2009

OTHER PUBLICATIONS

Lionshare; Connecting and Extending Peer-to-Peer Networks LionShare White Paper; Oct. 2004.
(Continued)

*Primary Examiner* — Shew Fen Lin
(74) *Attorney, Agent, or Firm* — Steven L. Nichols; Fabian VanCott (57) ABSTRACT

Managing file distribution in an online file sharing system implemented by at least one server includes inviting a first entity to access a shared file hosted by the online file sharing system, and allowing the first entity to reshare the shared the through the online file sharing system with at least a second entity only to an extent permitted by a resharing policy stored by the online file sharing system.

19 Claims, 7 Drawing Sheets

(56) References Cited

U.S. PATENT DOCUMENTS

| | | | |
|---|---|---|---|
| 8,341,219 B1* | 12/2012 | Young | H04N 1/00153 709/204 |
| 2003/0191720 A1 | 10/2003 | Wibisono | |
| 2003/0200436 A1 | 10/2003 | Eun et al. | |
| 2003/0229722 A1* | 11/2003 | Beyda | G06F 17/30525 707/770 |
| 2004/0267625 A1* | 12/2004 | Feng | G06Q 10/10 715/733 |
| 2005/0028006 A1* | 2/2005 | Leser | H04L 9/08 726/26 |
| 2005/0060281 A1* | 3/2005 | Bucher | G06F 16/93 |
| 2005/0138566 A1* | 6/2005 | Muller | G06Q 10/00 715/759 |
| 2005/0216381 A1 | 9/2005 | Banatwala et al. | |
| 2005/0262132 A1 | 11/2005 | Morita et al. | |
| 2006/0047698 A1 | 3/2006 | Fox | |
| 2006/0224735 A1* | 10/2006 | Hill | H04L 63/101 709/225 |
| 2007/0078900 A1 | 4/2007 | Donahue | |
| 2007/0094145 A1 | 4/2007 | Ta et al. | |
| 2008/0091682 A1* | 4/2008 | Lim | G06F 17/3089 |
| 2008/0229211 A1 | 9/2008 | Herberger et al. | |
| 2008/0256086 A1* | 10/2008 | Miyoshi | G06F 21/6272 |
| 2008/0263112 A1 | 10/2008 | Shaath et al. | |
| 2008/0288494 A1 | 11/2008 | Brogger et al. | |
| 2008/0307486 A1* | 12/2008 | Ellison | H04L 9/3263 726/1 |
| 2009/0017790 A1* | 1/2009 | Thalapaneni | H04L 61/1594 455/410 |
| 2009/0100109 A1* | 4/2009 | Turski | G06F 16/176 |
| 2009/0144392 A1 | 6/2009 | Wang | |
| 2009/0216859 A1* | 8/2009 | Dolling | H04L 63/126 709/218 |
| 2009/0282005 A1 | 11/2009 | Kim et al. | |
| 2009/0313304 A1 | 12/2009 | Goodger et al. | |
| 2011/0035503 A1* | 2/2011 | Zaid | H04L 63/0442 709/228 |
| 2012/0166544 A1* | 6/2012 | Wilder | G06Q 10/109 709/204 |
| 2014/0379673 A1* | 12/2014 | Lim | G06F 11/3006 707/694 |
| 2015/0304400 A1* | 10/2015 | Spivack | H04L 67/10 709/201 |

OTHER PUBLICATIONS

Goecks, Jeremy et al.; Leveraging Social Networks for Information Sharing; Georgia Institute of Technology; CSCW; Nov. 6-10, 2004; Chicago, Illinois, USA.

* cited by examiner

FILE RESHARING MANAGEMENT

BACKGROUND

Aspects of the present invention relate in general to online file sharing solutions, and more particularly, to methods for creating polices for the resharing of files over an online file sharing system.

Organizations commonly share many files over a network. Managing the sharing of these files can become complicated in larger organizations. This complication may be due, at least in part, to the overhead associated with maintaining multiple copies of files, the difficulty of managing updates, and/or the difficulty of managing comments and discussion associated with file sharing.

Another challenge associated with managing shared files is that of determining and enforcing which users in a system are allowed to see which types of files. This challenge becomes increasingly difficult when authorized users are permitted to "reshare" shared files with other users. Often times, it is desirable that authorized recipients of shared files reshare these files only with other authorized users. For example, a file may be shared with an authorized user, but there may not be adequate measures in place to ensure that the authorized user will not reshare that file with someone who is not authorized to view the file. It is also generally desirable that resharing policies be both user-friendly and secure.

BRIEF SUMMARY

A method for managing file distribution in an online file sharing system implemented by at least one server includes inviting a first entity to access a shared file hosted by the online file sharing system, and allowing the first entity to reshare the shared file through the online file sharing system with at least a second entity only to an extent permitted by a resharing policy stored by the online file sharing system.

A server includes at least one processor and at least one computer readable storage medium, the computer readable medium having at least one shared file and online file sharing software stored thereon. The online file sharing software is configured to cause the at least one processor to, upon execution of the online file sharing software, invite a first entity to access a shared file hosted by the online file sharing system, and allow the first entity to reshare the shared file through the online file sharing system with at least a second entity only to an extent permitted by a resharing policy stored by the online file sharing system.

A computer program product for managing the resharing of files, the computer program product includes a computer readable storage medium having computer readable code embodied therewith. The computer readable program code includes computer readable program code configured to invite a first entity to access a shared file hosted by the online file sharing system. The computer readable program code further includes computer readable program code configured to allow the first entity to reshare the shared file through the online file sharing system with at least a second entity only to an extent permitted by a resharing policy stored by the online file sharing system.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As mentioned above, the management of shared files over an online file sharing system typically involves finding a balance between user-friendly resharing polices and secure resharing polices. A simple user-friendly resharing policy may allow a recipient of a shared file to share the file with anyone. However, this policy may be less secure as some files are intended for only certain persons within an organization. For example, different members of an organization are often under different contractual obligations than one another regarding privacy and security matters. Conversely, a resharing policy may be relatively strict and not allow any user to reshare a file. This often creates difficulties when members of the organization need to reshare files to accomplish the tasks they have been given.

In light of these and other difficulties, the present specification relates to a method and system for managing file resharing polices associated with an online file sharing system. More particularly, the present specification discloses methods and systems that provide a user-friendly way to reshare files while at the same time restricting unauthorized use of shared files.

According to one illustrative embodiment, a method for managing file resharing in an online file sharing system may include inviting a user to access a shared file hosted by the online file sharing system. The user may then be allowed to reshare the shared file through the online file sharing system with other users only to an extent permitted by a resharing policy stored by the online file sharing system. The resharing policy may be based on one or more elements attached to, for example, an initiator of a reshare, the receiver of a reshare, the author of a file, and/or the shared file itself.

A resharing policy can be effectively managed and controlled in a collaborative environment by a person or group having authority to make such management decisions. Furthermore, authorized users may be able to share and reshare files easily with minimal managerial overhead, thus allowing them to accomplish the various tasks required of them.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "online file sharing system" will refer to a system capable of storing and sharing files among a number of users.

Throughout this specification and in the appended claims, the term "entity" will refer to an individual, a group of individuals, a system, or a group of systems which are capable of accessing and sharing files over a network.

Figure 1:
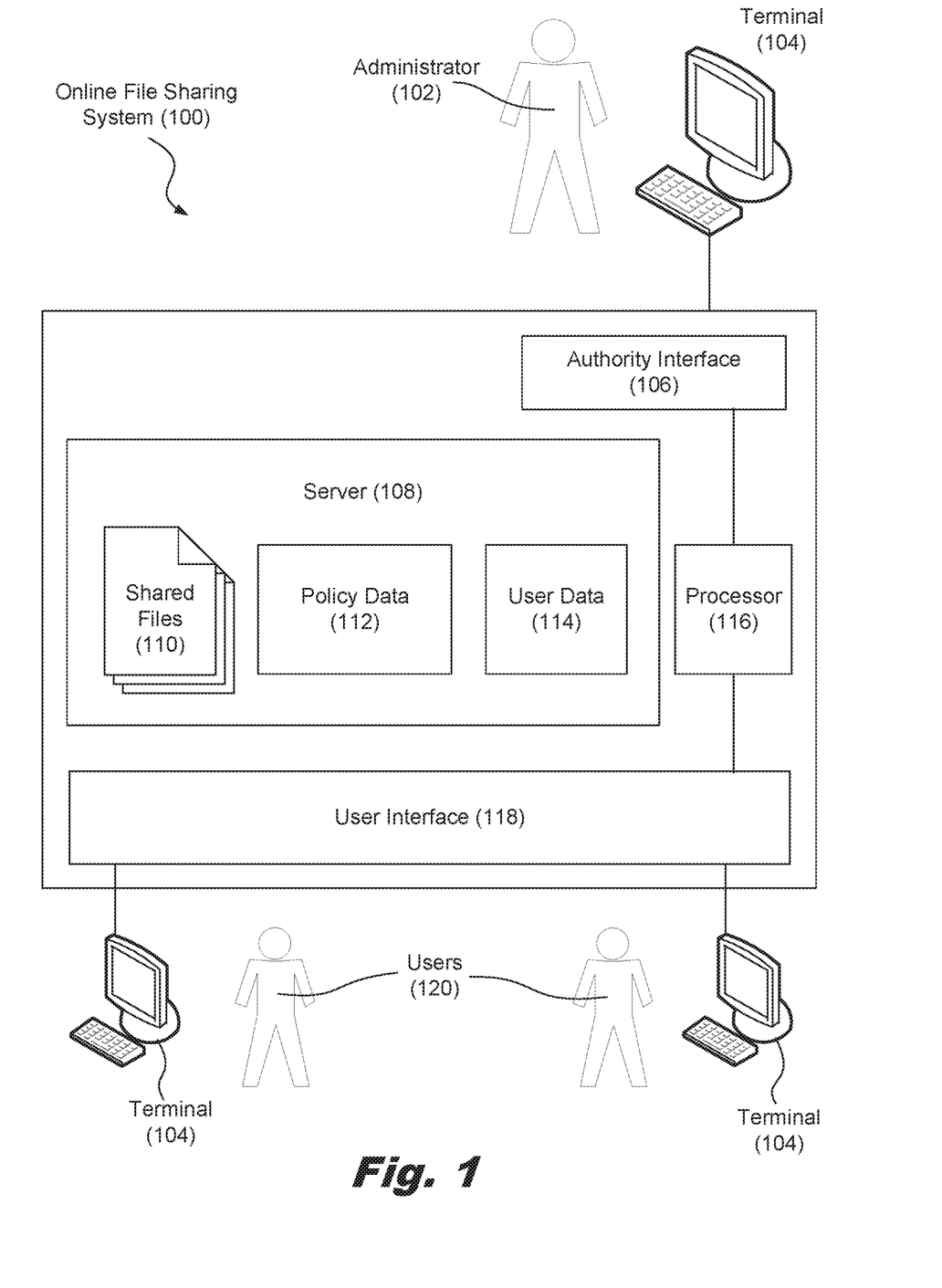
FIG. 1 is a diagram showing an illustrative online file sharing system, according to one embodiment of principles described herein.

Referring now to the figures, FIG. 1 is a diagram showing an illustrative online file sharing system (100). According to one illustrative embodiment, an online file sharing system (100) may include a server (108). The server (108) may have stored thereon shared files (110), policy data (112) and user data (114). The online file sharing system (100) may further include a processor (116), an authority interface (106), and a user interface (118).

In certain embodiments, the server (108) may be an internet server designed to handle an organization's file sharing system. Additionally or alternatively, the server (108) may be a component of an organization-specific local area network. The server (108) may include at least one computer readable storage medium. The storage medium may be locally associated with the server (108) or may be separate from the server (108) and accessible over the network.

The computer readable storage medium associated with the server (108) may have a number of electronic files (110) able to be shared stored thereon. These files (110) may be of a variety of file types including, but not limited to, documents, data files, and media files. These files (110) may further include executable programs or access links to executable programs which may be available over the local network or the Internet.

The policy data (112) stored on the computer readable storage medium may include a variety of file resharing policies. These policies may determine which users (120) are allowed to reshare received shared files (110), which users (120) are allowed to receive reshared files, and/or which specific reshared files a user (120) may or may not be able to receive. For example, in certain embodiments, all resharing may be prohibited except for the resharing of files (110) explicitly allowed by a system administrator (102). In alternative embodiments, all resharing of files (110) may be allowed except for those explicitly prohibited by the system administrator (102).

The policy data (112) may also define specific rights or privileges to be reshared. For example, a user may have the right to reshare "read-only" rights to certain other users. Additional reshare privileges such as "write" or "delete" may also be controlled by the resharing policy data (112).

The computer readable storage medium associated with the server (108) may have user data (114) stored thereon. The user data (114) may include information about each user (120) in the system. This data (114) may include information that may be used in conjunction with the policy data (112) to determine which users are allowed to reshare certain types of files or certain groups of files. For example, the user data (114) may include metadata associated with each user, and the policy data (112) may be used to interpret the metadata to determine the resharing privileges of users.

The authority interface (106) of the online file sharing system (100) may allow a system administrator (102) to access the online file sharing system (100) through a terminal (104). Through the terminal (104), a system administrator (102) may make or change policy rules related to the resharing of shared files (110). For example, an administrator (102) may set up resharing privileges for a new user (120). An administrator (102) may also upgrade or revoke resharing privileges of existing users (120). A system administrator may be any entity who is authorized to make decisions regarding the resharing of files over an organizations online file sharing system (100). In some embodiments, the administrator (102) may set resharing policies based on specific files or file types. The authority interface (106) may include any applicable hardware and software necessary to achieve this functionality.

The server (108) may also maintain a record of all file shares and reshares. This record may allow a system administrator (102) to see which files have been shared and with whom the files have been shared. This may allow a system administrator (102) to see if any users (120) are unauthorized recipients of a reshared file. This information may help the administrator make further changes to the resharing polices associated with the online file sharing system (100).

The user interface (118) may allow users (120) to access the online file sharing system (100) through a terminal (104). Through a terminal (104), a user (120) may perform a variety of tasks associated with the online file sharing system (100) including resharing files if allowed. The user interface (118) may include any applicable hardware and necessary to achieve this functionality.

The terminals (104) used to access the online file system (100) may include any computer hardware, software, and/or combination thereof that is capable of interacting with the online file system over a network. Terminals (104) may include, but are not limited to, desktop systems, laptop systems, PDA's, and internet mobile phone devices. A terminal (104) may be communicatively coupled to the online file sharing system (100) through a network, including, but not limited to, a local area network (LAN) or a wide area network (WAN) such as the internet.

Figure 2A:
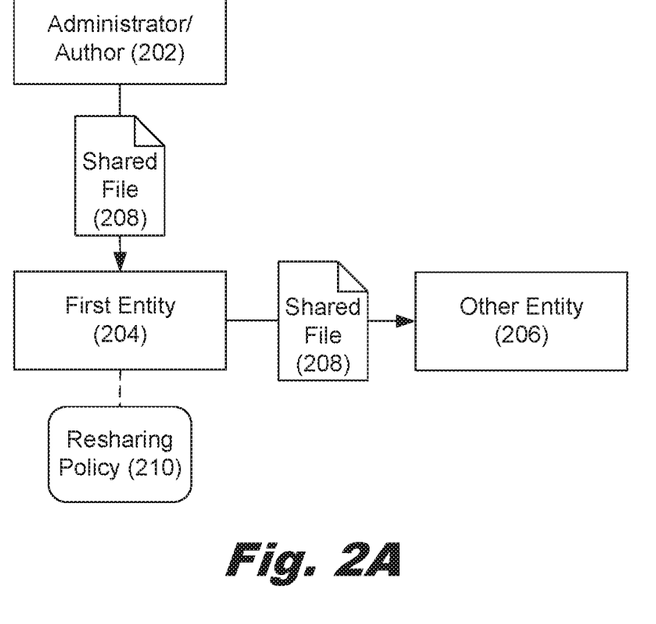
FIGS. 2A-2D are diagrams showing illustrative ways in which resharing policies may be applied, according to one embodiment of principles described herein.

FIGS. 2A-2D are diagrams showing illustrative ways resharing policies may be applied. FIG. 2A specifically illustrates a resharing policy (210) based on one or more attributes associated with an initiator of a file reshare. According to the present example, a first entity (204) receives access to a shared file (208) from an author or administrator (202). According to the resharing policy (210) associated with the first entity (204), the user may reshare the file (208) with at least one other entity (206). In this case, a resharing policy (210) associated with the first entity (204) determines which shared files (208) or shared file types the first entity (204) may reshare and with which other entities (206). Attributes associated with an entity may include, but are not limited to, position title, domain name of an email address, and Internet Protocol (IP) address.

Figure 2B:
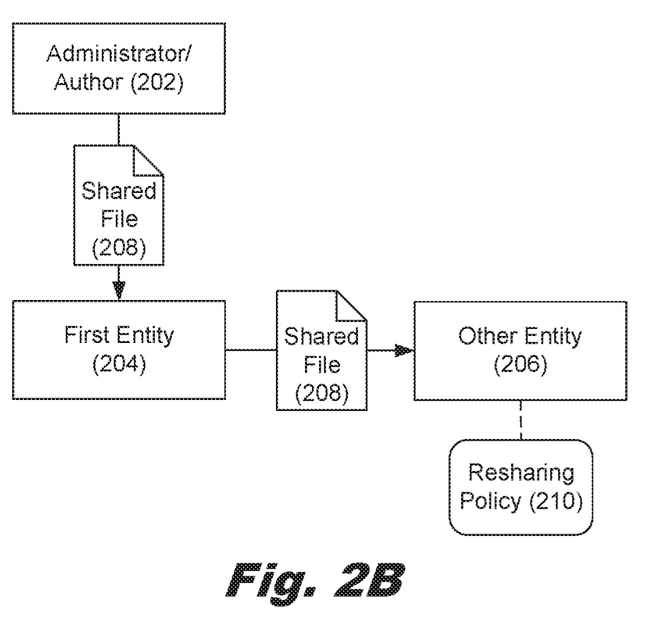

FIG. 2B is a diagram wherein a resharing policy (210) is based on one or more attributes associated with a recipient of a file reshare. According to the example of FIG. 2B, a first entity (204) receives access to a shared file (208) from an author or administrator (202). The first entity (204) may then attempt to reshare the file with another entity (206). The other entity (206) may receive the reshared the file (208) if allowed to by the resharing policy (210) associated with the receiving other entity. In this case, a resharing policy (210) associated with another entity (206) determines which reshared files (208) or reshared file types the other entity (204) may receive from a file share initiator.

In some cases, resharing polices may conflict with each other. For example, a conflict may occur if a first entity has the rights to reshare a shared file with other entities and tries to reshare a file with an entity that is prohibited from receiving reshared files. An administrator may have the ability to determine which resharing polices take priority in cases of such conflict. An administrator may also have the ability to override policies if necessary.

Figure 2C:
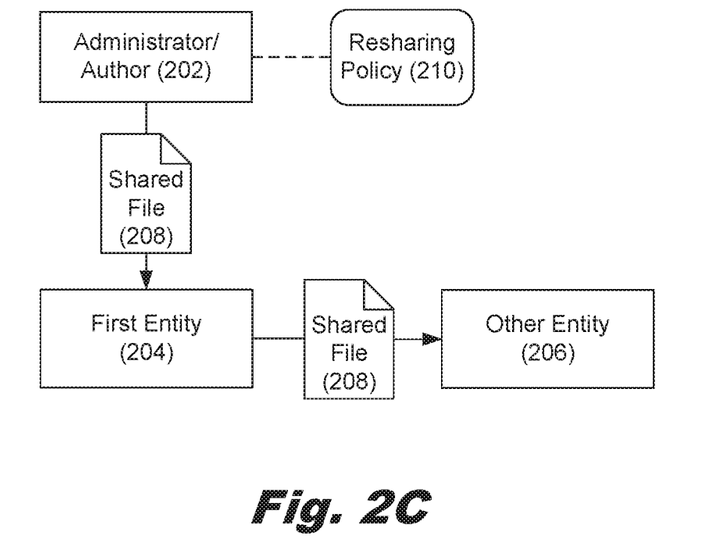

FIG. 2C is a diagram wherein a resharing policy is based on one or more attributes associated with an administrator or author (204) of a shared file (208). According to one embodiment, when an administrator or author (202) shares a file (208), the policies regulating how the shared file (208) may be reshared may be determined based on settings associated with the author or administrator (202). In this case, the online file sharing system associates with each author or administrator (202) of a shared file (208), resharing policies (210) which regulate how his or her shared files (208) may be reshared. Thus, when a first entity (204) receives a shared file, he or she may reshare the shared file (208) with another entity (206) if allowed by the resharing policy (210) associated with the author or administrator (202) of the shared file (208).

Figure 2D:
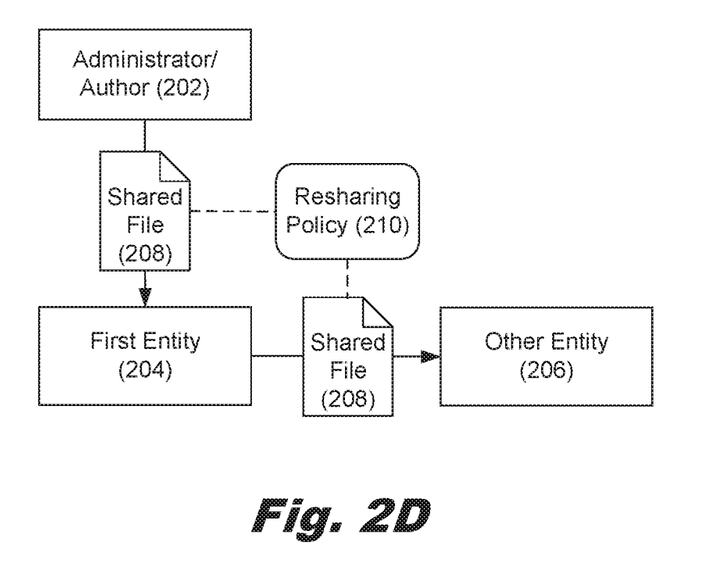

FIG. 2D is a diagram wherein a resharing policy (210) is based on one or more attributes associated with the shared file (208) itself, and may be assigned by an author or administrator (202) of the shared file (208). According to one embodiment, an author or administrator may specify which users are allowed to reshare or receive a reshare a specific shared file (208). In this case, when a first entity (204) receives access to a shared file (208), a resharing policy (210) associated with the shared file (208) may determine which other entities (206) with whom the first entity (204) may reshare the shared file (208). The resharing policy (210) may also determine which other entities (206) may receive access to the shared file (208). Attributes associated with a file may include, but are not limited to a security level assigned to the file, a confidentiality level assigned to a file, file type, file creation date, and the author of a file.

Figure 3A:
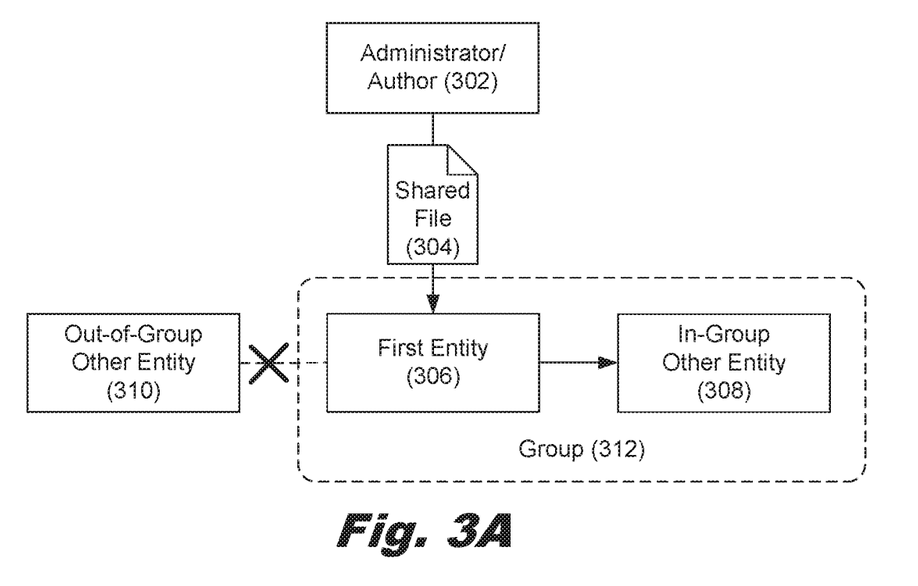
FIGS. 3A-3B are diagrams showing illustrative group resharing policy associations, according to one embodiment of principles described herein.
Figure 3B:
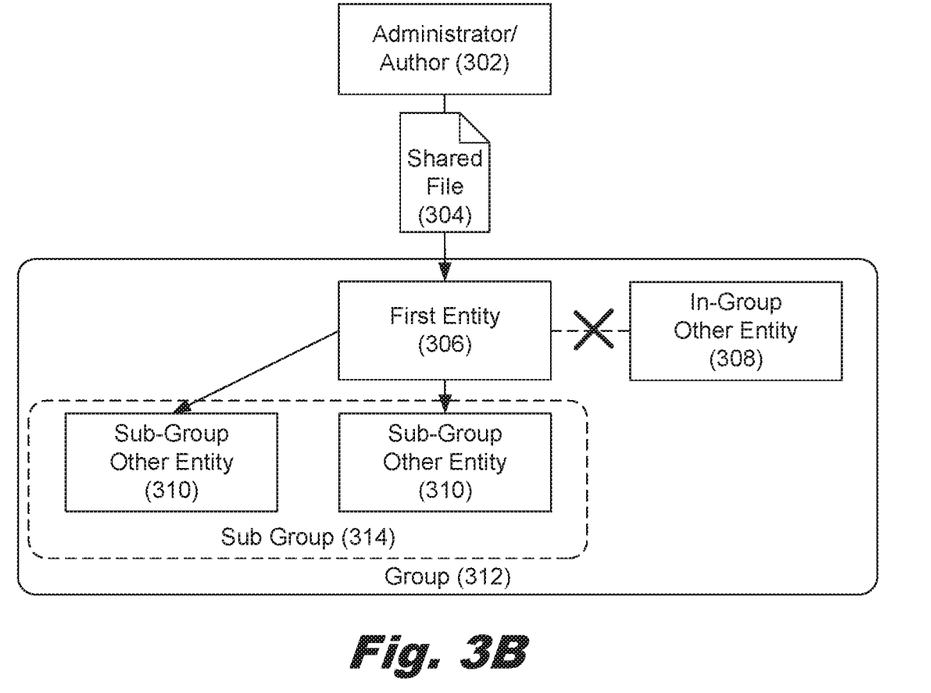

Resharing polices may also be associated with groups or subgroups. FIGS. 3A-3B are diagrams showing illustrative group (312) resharing policy associations. FIG. 3A is a diagram showing a system wherein resharing of shared files is allowed based on one or more attributes associated with a group assignment of entities (306, 308, 310). According to one illustrative embodiment, entities may be placed within groups depending on their position within an organization. In the case that a first entity (306) receives a shared file (304) from an author or administrator (302), the online file sharing system may be configured to allow the first entity (306) to reshare the shared file (304) with another entity (308) within the group (312). The first entity (306) may also be prohibited form resharing the shared file (304) with another entity (310) outside the group (312). A group may be defined by a number of factors such as a domain name or other organizational identifiers.

FIG. 3B is a diagram showing a system wherein resharing of shared files is allowed based on group and subgroup assignment of entities (306, 308, 310). According to one illustrative embodiment, an online file sharing system may place members of an organization within groups and subgroups. One resharing policy may be placed for entities within a group (312). A different resharing policy may also apply to entities (310) within a subgroup (314). For example, if a first entity (306) receives a shared file (304) from an author or administrator (302), the first entity (306) may only be allowed to reshare the shared file (304) with other entities (310) within a particular subgroup (314). The first entity may also be prohibited from resharing the shared file (304) with other entities (308) within the group but not in the subgroup (314). Additionally or alternatively, entities (310) within a subgroup (314) may have different resharing policy restrictions imposed on them than are imposed on the group (312) containing the subgroup (314).

For example, an engineering project manager may be part of an engineering group. The engineering group may have a subgroup for the project team working under the project manager. That project manager may be able to reshare files with users in the subgroup for which he or she is assigned to manage. The project manager may also be prohibited from resharing files with other people in the engineering group who are not in the project subgroup. Furthermore, a separate file resharing policy may be assigned to users within the project subgroup that does not apply generally to other users within the engineering group.

Figure 4:
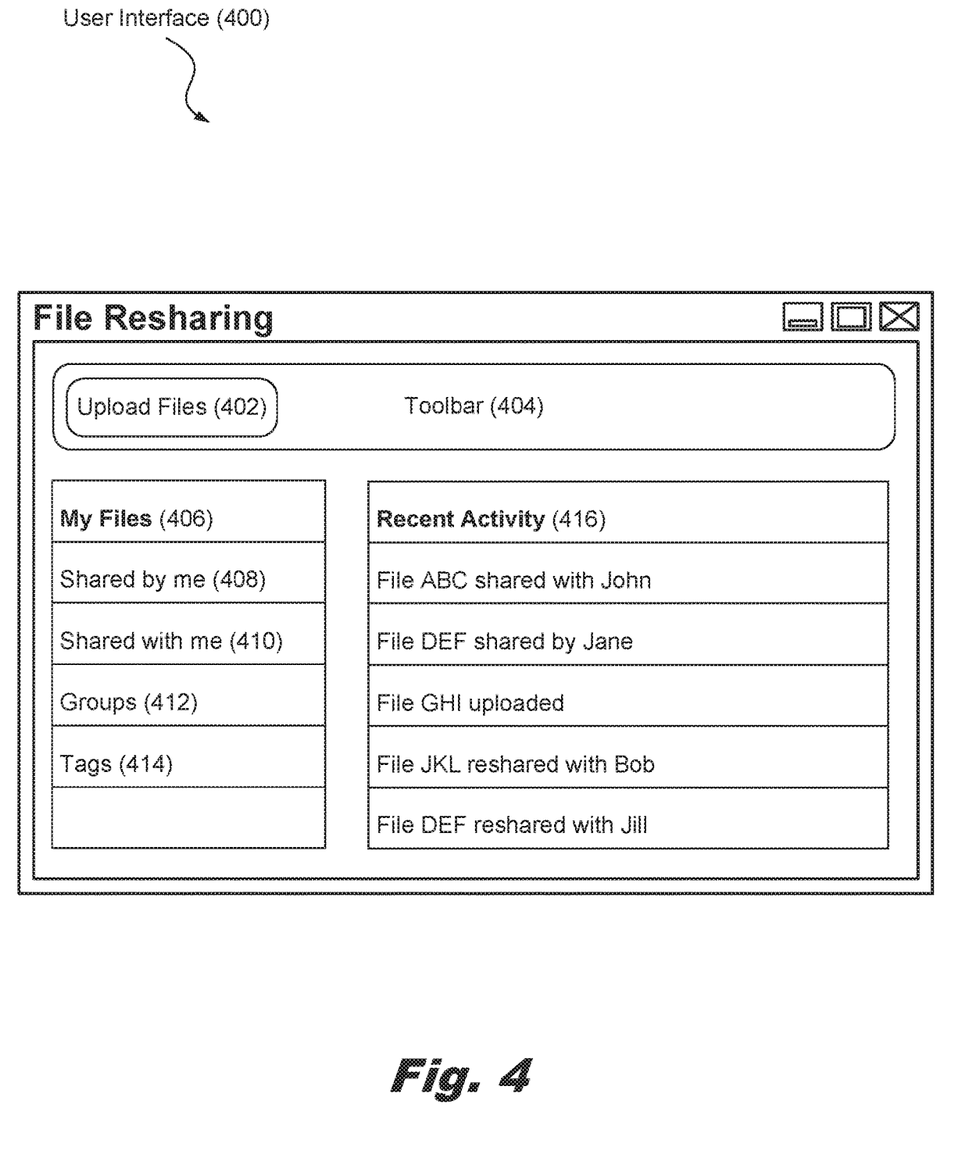
FIG. 4 is a diagram of an illustrative user interface for managing the sharing and resharing of files, according to one embodiment of principles described herein.

FIG. 4 is a diagram of an illustrative user interface (400) for managing the sharing and resharing of files. According to the present example, a file resharing user interface (400) may include a toolbar (404) with an upload files button (402), a "My Files" section (406), and a "Recent Activity" section (416).

The toolbar (404) may contain a number of menu items, features, and options which are common in computer applications. The toolbar may allow both users and administrators to use the various functions associated with the online file sharing system. In one embodiment, the toolbar (404) may contain an "upload files" button which will allow users to share files with other users.

The "My Files" section (406) may include a number of features including a "Shared by me" feature (408), a "Shared with me" feature (410), a "Groups" feature (412), a "Tags" feature (414), and a "Collaborations" feature (416).

The "Shared by me" feature (408) may allow a user to review files which the user has shared with other users. The feature (408) may allow a user to see when and with whom certain files were shared and what polices were associated with the shares. Particularly, a user may see which resharing polices were associated with the share. This may remind a user which people are allowed to see the shared file.

The "Shared with me" feature (410) may allow a user to review the files which other users have shared with him or her. This feature (410) may also allow a user to see what resharing polices are associated with the shared files. This may inform the user which other users they are allowed to reshare the file with.

The "Groups" feature (412) may allow a user to see which groups are associated with the organization. The user may be able to see which users are within which groups or subgroups. The user may further be able to see what resharing polices are associated with the groups. This may allow the user to know who he or she is able to reshare files with.

The "Tags" feature (414) may allow a user to tag a file which is to be shared. A tag may place certain kinds of resharing policy restrictions on a shared file. For example, if a shared file is confidential, a user may tag it with a "confidential" tag. The tagged file may then only be reshared with users who are authorized to view files tagged as confidential. There may be several levels of confidentiality and tags associated with each level.

The "Recent Activity" section (416) may display to a user, the various sharing, and resharing activities which a user has been associated with. If the user is an administrator, the recent activity may display all resharing activities relevant to the administrator which are occurring in the organization. This notification of reshares may also occur outside of the user interface. For example, an administrator may receive a message through a means of communication such as an email indicating that a particular reshare has occurred. In certain embodiments, an administrator may filter which notifications of which types or reshares with which he or she is notified. Additionally or alternatively, notification of reshares may be provided to an author or owner of a file.

Figure 5:
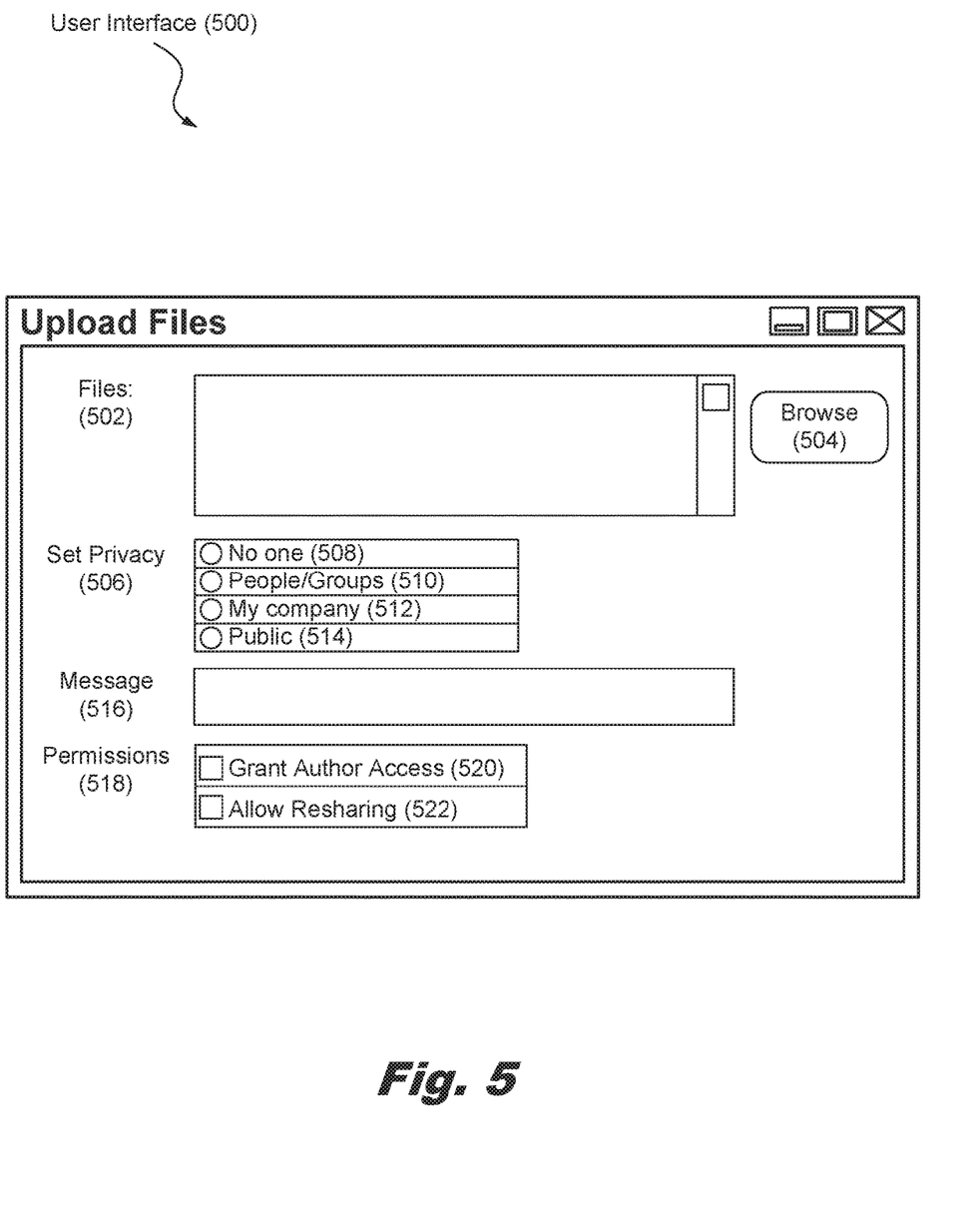
FIG. 5 is a diagram of an illustrative user interface for uploading files to be shared or reshared, according to one embodiment of principles described herein.

When a user uploads a file to the online file sharing system, they may have several options which may affect the resharing policy associated with the uploaded file. FIG. 5 is a diagram of an illustrative user interface (500) for uploading files to be shared or reshared. According to one illustrative embodiment, the user interface (500) for uploading files may include a "Files" section (502), a "Browse" button (504), a "Set Privacy" section (506), a "Message" section (516) and a "Permissions" section (518).

The "Files" section (502) may include a list of the files which the user desires to upload to the online file sharing system. The "Browse" button (504) may allow the user to browse a number of file directories available and select files to be uploaded to the system.

The "Set Privacy" section (506) may allow which other users are allowed to see or open the uploaded file or files. If "no one" (508) is selected, only the user uploading the files may have access to the file. "People/Groups" (510) is selected, the user may then select which groups or other users which may view the uploaded file. If "My Company" (512) is selected, all users within the organization of the user may view the uploaded file. If "Public" (514) is selected, any person with access to the online file sharing system may view the uploaded file.

The "Message" section (516) may allow a user to associate a message with an uploaded file. This message may be a description of the file. The message may also describe the level of confidentiality associated with the file.

The "Permissions" section may allow a user to add a few additional properties to an uploaded file. The user may have the option to allow author access (520). This may give those who have the right to view the uploaded file, the right to edit or make changes to the uploaded file. The user may also explicitly allow resharing (522) of the uploaded files. The resharing may be further restricted by other resharing policies associated with the online file sharing system.

Figure 6:
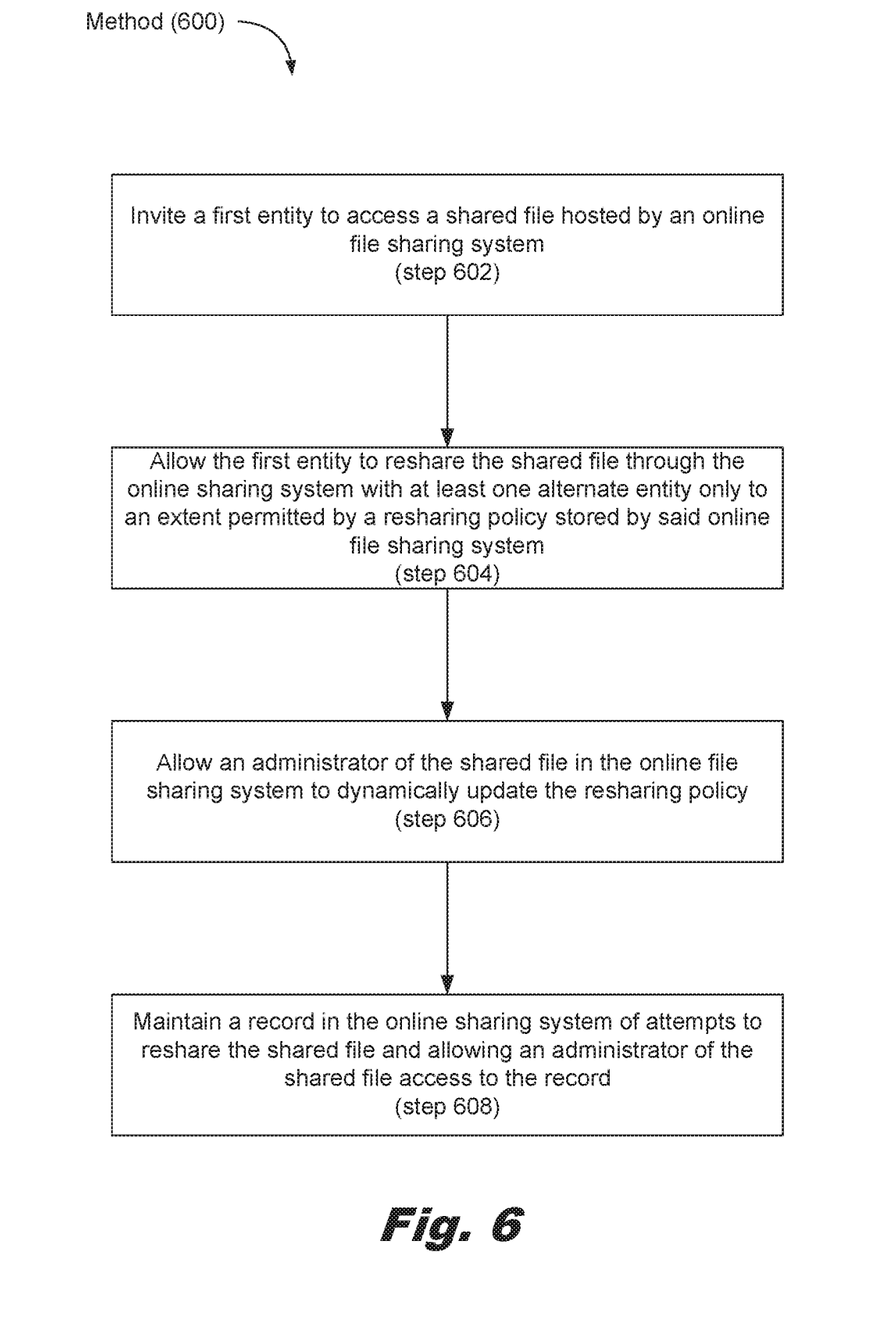
FIG. 6 is a flowchart showing an illustrative method for managing file distribution in an online file sharing system, according to one embodiment of principles described herein.

FIG. 6 is a flowchart showing an illustrative method (600) for managing file distribution in an online file sharing system. The method (600) for managing the resharing of files on an online file sharing system may include inviting (step 602) a first entity to access a shared file hosted by the online file sharing system, and allowing (step 604) the first entity to reshare the shared file through the online file sharing system with at least one other entity only to an extent permitted by a resharing policy stored by the online file sharing system. The method (600) may further include allowing (step 606) an administrator of the shared file in the online file sharing system to dynamically update the resharing policy, and maintaining (step 608) a record in the online file sharing system of attempts to reshare the shared file and allowing an administrator of the shared file access to the record.

In sum, an online file sharing system includes a centrally managed file resharing policy. The file resharing policy may be associated with a variety of elements including, but not limited to, an initiator or a reshare, a recipient of a reshare, an author of a file to be reshared, the file intended to be reshared, and a group or subgroup associated with an initiator or recipient of a file reshare.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for managing file distribution in an online file sharing system implemented by a server, the method comprising:
    inviting a first entity to access a shared file hosted by the online file sharing system;
    extracting, from user data, metadata associated with:
        the first entity who is to re-share the shared file;
        a second entity who is to receive a re-shared file; and
        the shared file;
    extracting policy data which indicates which files the first entity may share, which files a second entity may receive, and which shared files may be re-shared;
    determining, based on metadata associated with the first entity, metadata associated with the second entity, metadata associated with the shared file, and the policy data, a resharing policy which indicates whether the shared file may be reshared with the second entity;
    resharing the shared file by:
        imposing resharing restrictions based on the resharing policy; and
        allowing the first entity to reshare the shared file through the online file sharing system with at least the second entity only to an extent permitted by the resharing policy indicated by a tag associated with the shared file, in which the resharing policy determines users that are allowed to receive reshared files based on attributes of the first entity and attributes of the shared file;
    notifying an author of the shared file of the reshare of the shared file; and
    presenting a user with a user interface for managing a sharing and resharing of files, the user interface identifying:
        files which the user has shared;
        files that have been shared with the user;
        which groups are associated with an organization and which users are within which groups; and
        recent sharing activity associated with the user.

2. The method of claim 1, further comprising determining whether the second entity is an unauthorized recipient of the reshared file.

3. The method of claim 1, wherein the resharing policy:
    allows the first entity to reshare the shared file with an entity within a group; and
    prohibits the first entity from resharing the shared file with an entity outside the group.

4. The method of claim 3, further comprising allowing a user to see the resharing policy associated with the group.

5. The method of claim 1, further comprising allowing a user to see the resharing policy associated with the shared file.

6. The method of claim 1, wherein notifying an author of the shared file of the reshare of the shared file comprises sending an email to the author of the shared file indicating that a particular reshare has occurred.

7. The method of claim 1, further comprising allowing the first entity to indicate which other users are allowed to open an uploaded file.

8. The method of claim 1, further comprising altering sharing permissions based on the resharing policy.

9. The method of claim 1, further comprising extracting from user data, metadata associated with the first entity.

10. The method of claim 9, further comprising, interpreting the metadata, using policy data to determine resharing privileges of the first entity.

11. The method of claim 1, further comprising recording all file shares and reshares.

12. The method of claim 1, wherein imposing resharing restrictions is further based on access rights of the shared file.

13. The method of claim 1, wherein imposing resharing restrictions is further based on a confidentiality level of the shared file.

14. A server comprising:
a processor; and
a memory, having an online file sharing software stored thereon;
in which the online file sharing software is configured to cause the processor to, upon execution of the online file sharing software:
invite a first entity to access a shared file hosted by an online file sharing system;
extract, from user data, metadata associated with:
the first entity who is to re-share the shared file;
a second entity who is to receive a re-shared file; and
the shared file;
extract policy data which indicates which files the first entity may share, which files a second entity may receive, and which shared files may be re-shared;
determine, based on metadata associated with the first entity, metadata associated with the second entity, metadata associated with the shared file, and the policy data, a resharing policy which indicates whether the shared file may be reshared with the second entity;
reshare the shared file by:
imposing resharing restrictions by enforcing resharing policy restrictions; and
allowing the first entity to reshare the shared file through the online file sharing system with at least the second entity only to an extent permitted by the resharing policy indicated by a tag associated with the shared file, in which the resharing policy determines users that are allowed to receive reshared files based on attributes of the first entity and attributes of the shared file;
notify an author of the shared file of the reshare of the shared file;
present a user with a user interface for managing a sharing and resharing of files, the user interface identifying:
files which the user has shared;
files that have been shared with the user;
which groups are associated with an organization and which users are within which groups; and
recent sharing activity associated with the user;
alter sharing and resharing permissions by changing attributes via the user interface; and
manage file sharing based on altered sharing and resharing permissions.

15. The server of claim 14, wherein users that are allowed to receive reshared files and shared files that can be reshared are determined from attributes of an author of the shared file.

16. The server of claim 14, wherein the tag indicates one of several levels of confidentiality for the shared file.

17. A computer program product for managing the resharing of artifacts, the computer program product comprising:
a computer readable memory having computer readable program code embodied therewith, the computer readable program code comprising:
computer readable program code to invite a first entity to access a shared file hosted by an online file sharing system;
computer readable program code to extract, from user data, metadata associated with:
the first entity who is to re-share the shared file;
a second entity who is to receive a re-shared file; and
the shared file;
computer readable program code to extract policy data which indicates which files the first entity may share, which files a second entity may receive, and which shared files may be re-shared;
computer readable program code to determine, based on metadata associated with the first entity, metadata associated with the second entity, metadata associated with the shared file, and the policy data, a resharing policy which indicates whether the shared file may be reshared with the second entity;
computer readable program code to reshare the shared file by:
imposing resharing restrictions by enforcing resharing policy restrictions;
altering sharing permissions based on at least one resharing policy indicated by a tag associated with the shared file, in which the at least one resharing policy determines users that are allowed to receive reshared files based on attributes of the first entity and attributes of the shared file;
allowing the first entity to reshare the shared file through the online file sharing system with the second entity only to an extent permitted by the resharing policy;
identifying conflicts between a first resharing policy authorizing the first entity to reshare the shared file and a second resharing policy preventing the second entity from receiving the shared file; and
overriding at least one of the first resharing policy and the second resharing policy;
computer readable program code to notify an author of the shared file of the reshare of the shared file;
computer readable program code to present a user with a user interface for managing a sharing and resharing of files, the user interface identifying:
files which the user has shared;
files that have been shared with the user;
which groups are associated with an organization and which users are within which groups; and
recent sharing activity associated with the user;
computer readable program code to alter sharing and resharing permissions by changing attributes via the user interface; and
computer readable program code to manage file sharing based on altered sharing and resharing permissions.

18. The computer program product of claim 17, wherein the at least one resharing policy comprises:
a first resharing policy applied to entities within a group; and a second resharing policy applied to entities within a subgroup of the group.

19. The computer program product of claim 17, further comprising allowing the second entity to receive a shared file with a confidential tag when metadata related to the second entity indicates the second entity is authorized to view confidential files.

\* \* \* \* \*